United States Patent
Song et al.

(10) Patent No.: US 10,997,578 B2
(45) Date of Patent: May 4, 2021

(54) MOBILE TERMINAL AND CONTROL METHOD THEREOF

(71) Applicant: LG ELECTRONICS INC., Seoul (KR)

(72) Inventors: Hyewon Song, Seoul (KR); Dongsu Han, Seoul (KR); Mihyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 353 days.

(21) Appl. No.: 15/746,800

(22) PCT Filed: Aug. 18, 2015

(86) PCT No.: PCT/KR2015/008600
§ 371 (c)(1),
(2) Date: Jan. 22, 2018

(87) PCT Pub. No.: WO2017/018577
PCT Pub. Date: Feb. 2, 2017

(65) Prior Publication Data
US 2020/0082377 A1 Mar. 12, 2020

(30) Foreign Application Priority Data
Jul. 24, 2015 (KR) .................... 10-2015-0105273

(51) Int. Cl.
*G06Q 20/04* (2012.01)
*G06Q 20/32* (2012.01)
(Continued)

(52) U.S. Cl.
CPC .......... *G06Q 20/325* (2013.01); *G06F 21/32* (2013.01); *G06Q 20/40145* (2013.01);
(Continued)

(58) Field of Classification Search
None
See application file for complete search history.

(56) References Cited

U.S. PATENT DOCUMENTS 7,640,185 B1 * 12/2009 Giordano ............. G06Q 20/208
705/1.1
2002/0109614 A1 * 8/2002 Kim ...................... G06F 3/0233
341/23
(Continued)

FOREIGN PATENT DOCUMENTS

EP 2874111 5/2015
JP 2011035749 2/2011
(Continued)

OTHER PUBLICATIONS

European Patent Office Application Serial No. 15899723.9, Search Report dated Feb. 20, 2019, 8 pages.
(Continued)

*Primary Examiner* — William J Jacob
(74) *Attorney, Agent, or Firm* — Lee, Hong, Degerman, Kang & Waimey

(57) ABSTRACT

The present invention relates to a mobile terminal which is capable of executing some functions in a power-off state, and a control method thereof. The mobile terminal includes a user input unit for sensing a predetermined user input in a power-off state; a controller for entering into an emergency settlement mode, in which only some functions are executed using the remaining power, on a basis of user information inputted by the user input being authenticated; and a wireless communication unit for receiving a settlement request signal from an external terminal and transmitting settlement information corresponding to the settlement request signal to the external terminal in the emergency settlement mode.

20 Claims, 15 Drawing Sheets

(51) Int. Cl.
    *H02J 50/20*     (2016.01)
    *H04W 4/80*     (2018.01)
    *G06F 21/32*     (2013.01)
    *G06Q 20/40*     (2012.01)
    *H02J 7/02*     (2016.01)
    *H04B 5/00*     (2006.01)
    *H04W 12/06*     (2021.01)
    *H04W 52/02*     (2009.01)
    *H02J 7/00*     (2006.01)

(52) U.S. Cl.
    CPC .............. *H02J 7/025* (2013.01); *H02J 7/027* (2013.01); *H02J 50/20* (2016.02); *H04B 5/0037* (2013.01); *H04W 4/80* (2018.02); *H04W 12/06* (2013.01); *H04W 52/0254* (2013.01); *G06Q 20/04* (2013.01); *H02J 7/00045* (2020.01)

(56) References Cited

U.S. PATENT DOCUMENTS

| | | | | |
|---|---|---|---|---|
| 2003/0023885 | A1* | 1/2003 | Potter | G06F 1/3203 713/300 |
| 2006/0075268 | A1* | 4/2006 | Kim | G06F 1/3203 713/300 |
| 2007/0233597 | A1* | 10/2007 | Petersen | G06Q 20/04 705/39 |
| 2010/0111002 | A1* | 5/2010 | Xu | H04M 3/4288 370/329 |
| 2010/0207575 | A1 | 8/2010 | Pijnenburg et al. | |
| 2011/0117839 | A1* | 5/2011 | Rhelimi | G06K 19/0719 455/41.1 |
| 2011/0320345 | A1* | 12/2011 | Taveau | G06Q 20/32 705/39 |
| 2012/0005612 | A1* | 1/2012 | Huang | H04M 1/72566 715/771 |
| 2013/0122806 | A1* | 5/2013 | Yun | G06K 7/10237 455/41.1 |
| 2014/0297539 | A1* | 10/2014 | Swamy | G06Q 20/4012 705/71 |
| 2015/0046324 | A1* | 2/2015 | de la Cropte de Chanterac | G07F 7/0873 705/41 |
| 2015/0142653 | A1* | 5/2015 | Neumann | G06Q 20/3278 705/44 |

FOREIGN PATENT DOCUMENTS

| | | |
|---|---|---|
| JP | 2013089156 | 5/2013 |
| KR | 20110020996 | 3/2011 |
| KR | 20120082499 | 7/2012 |
| KR | 20140051189 | 4/2014 |
| WO | 2009147094 | 12/2009 |
| WO | 2010111002 | 9/2010 |

OTHER PUBLICATIONS

PCT International Application No. PCT/KR2015/008600, Written Opinion of the International Searching Authority dated Apr. 22, 2016, 10 pages.

European Patent Office Application Serial No. 15899723.9, Office Action dated Jan. 26, 2021, 8 pages.

* cited by examiner

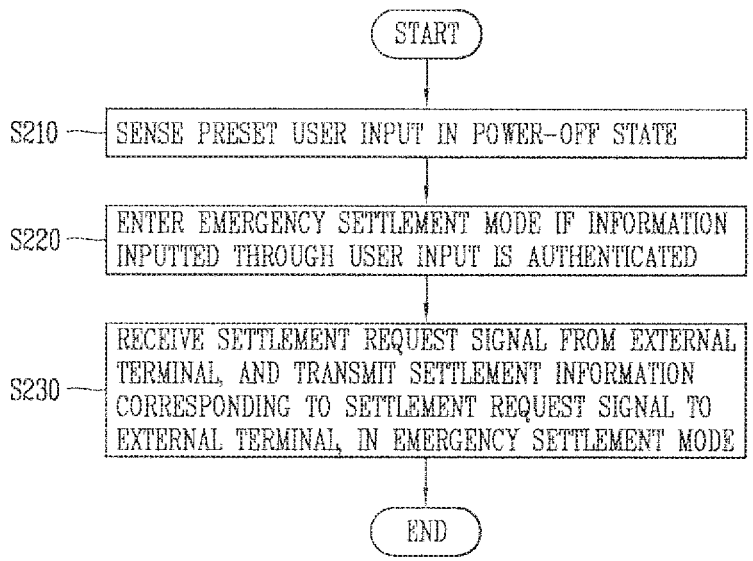
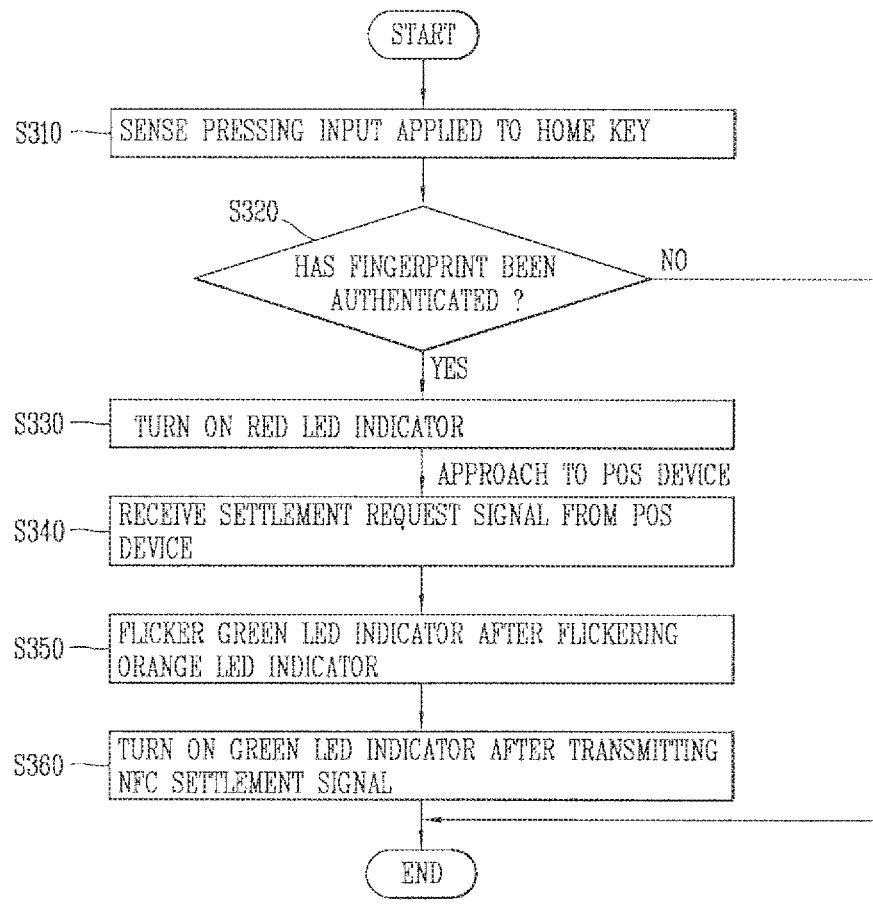

MOBILE TERMINAL AND CONTROL METHOD THEREOF

CROSS-REFERENCE TO RELATED APPLICATIONS

This application is the National Stage filing under 35 U.S.C. 371 of International Application No. PCT/KR2015/008600, filed on Aug. 18, 2015, which claims the benefit of earlier filing date and right of priority to Korean Application No. 10-2015-0105273, filed on Jul. 24, 2015, the contents of which are all hereby incorporated by reference herein in their entirety.

TECHNICAL FIELD

The present invention relates to a mobile terminal capable of performing some functions in a low-power state, and a control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the mobile terminals become multifunctional, it is implemented as a multimedia player having complicated functions such as capturing images or videos, playing music or video files, playing games, and receiving broadcastings.

Even in a no-power state or a low-power state where it is difficult to drive an OS by a battery of the mobile terminal, or even in a state where it is difficult to perform a normal touch interface due to a destroyed panel, some functions are required to be performed in case of an emergency.

Efforts are ongoing to support and increase the functionality of mobile terminals. Such efforts include software and hardware improvements, as well as changes and improvements in the structural components.

DISCLOSURE OF THE INVENTION

Therefore, an object of the present invention is to solve the aforementioned problems and other problems. Another object of the present invention is to provide a mobile terminal capable of performing an emergency settlement after undergoing a user authentication in a low-power state or a no-power state, and a control method thereof.

To achieve these and other advantages and in accordance with the purpose of the present invention, as embodied and broadly described herein, there is provided a mobile terminal, comprising: a user input unit for sensing a preset user input in a power-off state; a controller for controlling the mobile terminal to enter an emergency settlement mode where only some functions are performed by using a remaining power if user information inputted through the user input is authenticated; and a wireless communication unit for receiving a settlement request signal from an external terminal, and transmitting settlement information corresponding to the settlement request signal to the external terminal, in the emergency settlement mode.

In an embodiment, the controller receives a power from the external terminal such that the remaining power is more than a threshold value for entering the emergency settlement mode, based on a gesture approaching to the external terminal.

In another embodiment, the mobile terminal further comprises an optical output module for outputting light in a preset manner in correspondence to each event, if at least one of the events occurs in a case that the preset user input is sensed, a case that the inputted user information is authenticated, a case that the mobile terminal enters the emergency settlement mode, a case that a settlement request signal is received from the external terminal, a case that settlement information corresponding to the settlement request signal is transmitted to the external terminal, and a case that a power is received from the external terminal.

In another embodiment, the controller controls the mobile terminal to enter the emergency settlement mode, if user fingerprint information inputted through a fingerprint input unit disposed on a front surface or a rear surface is authenticated in the power-off state.

In another embodiment, the user input unit additionally receives preset user information, if the mobile terminal is on a preset position before the settlement information corresponding to the settlement request signal is transmitted to the external terminal.

In another embodiment, the wireless communication unit transmits the settlement information to the external terminal if the additionally-input user information is authenticated.

In another embodiment, the controller calculates a communication network to which the settlement information is to be transmitted, based on a range of a settlement amount corresponding to the settlement request signal.

In another embodiment, the wireless communication unit transmits the settlement information corresponding to the settlement request signal to the external terminal, through the calculated communication network.

In another embodiment, the controller controls the optical output module such that light is outputted in a preset manner if an event which cannot be settled by a preset settlement means occurs, and the controller changes the settlement means based on a preset user input.

In another embodiment, the mobile terminal further comprises a display unit for outputting video information corresponding to the settlement information, to its one region which is in an off state.

To achieve these and other advantages and in accordance with the purpose of the present invention, as embodied and broadly described herein, there is also provided a control method of a mobile terminal, the method, comprising: (a) sensing a preset user input in a power-off state; (b) entering an emergency settlement mode where only some functions are performed by using a remaining power if user information inputted through the user input is authenticated; and (c) receiving a settlement request signal from an external terminal, and transmitting settlement information corresponding to the settlement request signal to the external terminal, in the emergency settlement mode.

In an embodiment, the step (a) includes receiving a power from the external terminal such that the remaining power is more than a threshold value for entering the emergency settlement mode, based on a gesture approaching to the external terminal.

In another embodiment, each of the steps includes outputting light through an optical output module in a preset manner in correspondence to each event, if at least one of the events occurs in a case that the preset user input is sensed, a case that the inputted user information is authenticated, a case that the mobile terminal enters the emergency settlement mode, a case that a settlement request signal is received from the external terminal, a case that settlement information corresponding to the settlement request signal is transmitted to the external terminal, and a case that a power is received from the external terminal.

In another embodiment, the step (b) includes controlling the mobile terminal to enter the emergency settlement mode, if user fingerprint information inputted through a fingerprint input unit disposed on a front surface or a rear surface is authenticated in the power-off state.

In another embodiment, the step (c) includes additionally receiving preset user information, if the mobile terminal is on a preset position before the settlement information corresponding to the settlement request signal is transmitted to the external terminal.

In another embodiment, the step (c) includes transmitting the settlement information to the external terminal if the additionally-input user information is authenticated.

In another embodiment, the step (c) includes calculating a communication network to which the settlement information is to be transmitted, based on a range of a settlement amount corresponding to the settlement request signal.

In another embodiment, the step (c) includes transmitting the settlement information corresponding to the settlement request signal to the external terminal, through the calculated communication network.

In another embodiment, the step (c) includes controlling the optical output module such that light is outputted in a preset manner if an event which cannot be settled by a preset settlement means occurs, and changing the settlement means based on a preset user input.

In another embodiment, the step (c) includes outputting video information corresponding to the settlement information, to one region of a display unit which is in an off state.

Effects of the Present Invention

The mobile terminal and the control method thereof according to the present invention may have the following effects.

In at least one of preferred embodiments of the present invention, an emergency settlement may be performed even in a power-off state.

Further, in at least one of preferred embodiments of the present invention, a color of LED light outputted at the time of an emergency settlement, a flickering pattern, an output time, etc. may be directly set.

As a result, user convenience may be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

FIG. 2 is a flowchart for explaining a control method of a mobile terminal according to the present invention;

FIG. 3 is a flowchart showing an embodiment of an emergency settlement process;

FIG. 14 is a conceptual view for explaining an embodiment to check an emergency settlement history when a power is turned on;

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
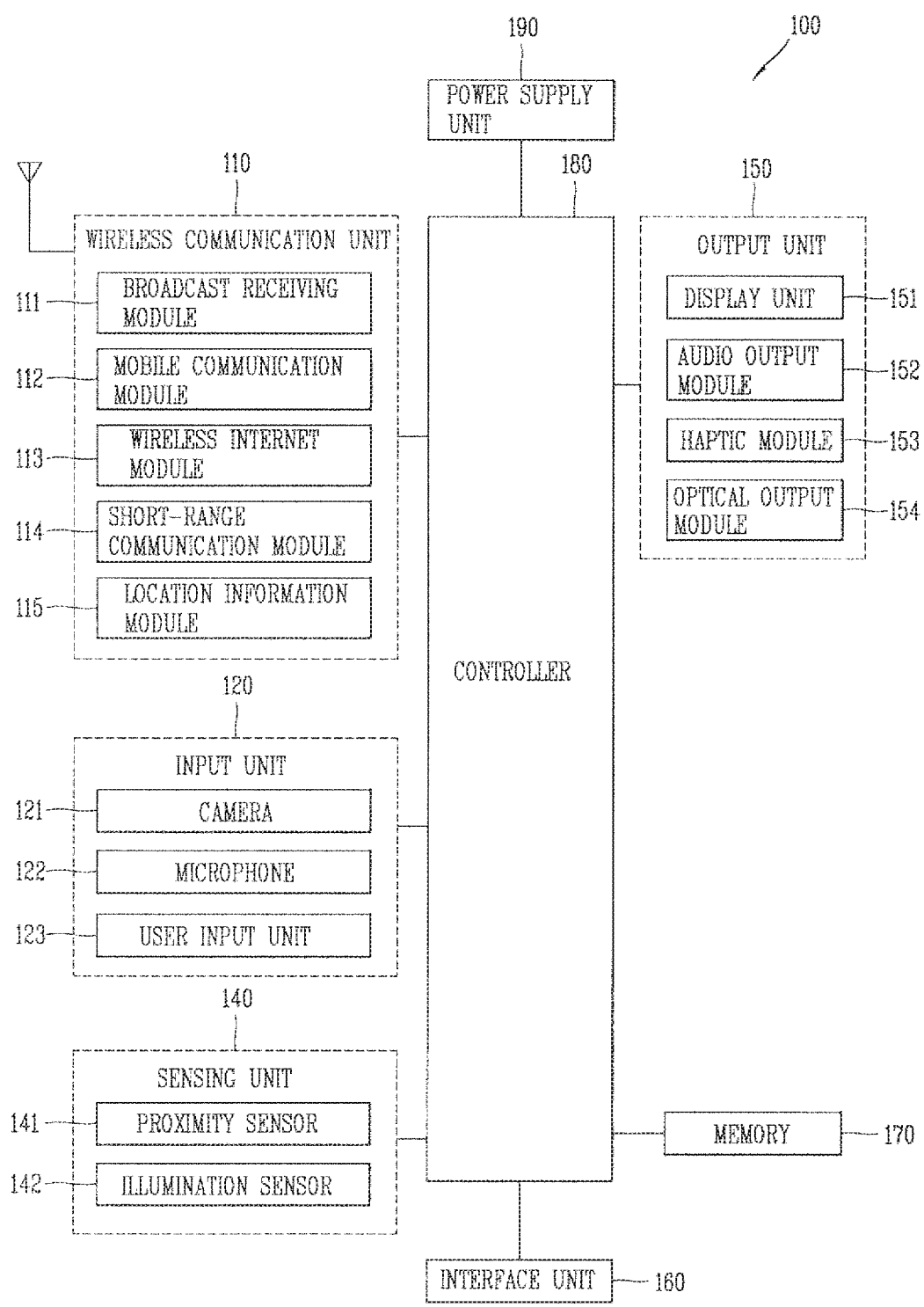
FIG. 1A is a block diagram of a mobile terminal according to the present disclosure.
Figure 1B:
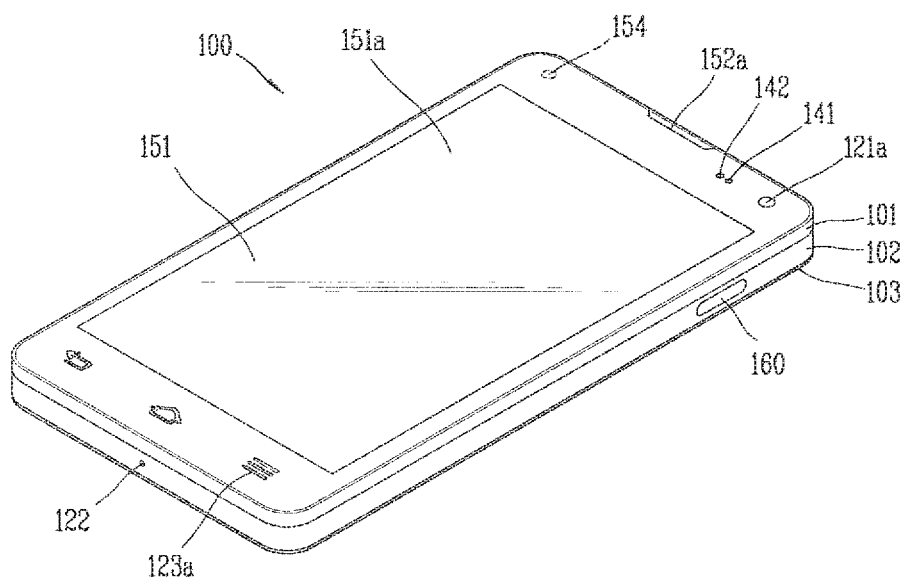
FIGS. 1B and 1C are conceptual views illustrating an example of a mobile terminal according to the present invention, which are viewed from different directions.
Figure 1C:
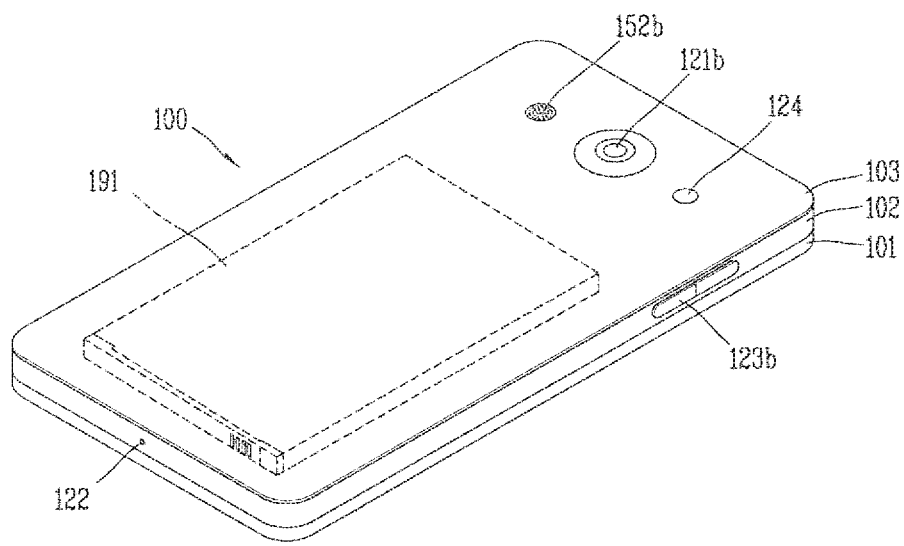

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the mobile terminal may be implemented on the mobile terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Reference will now be made in detail to the preferred embodiments of a control method of a mobile terminal according to the present invention, examples of which are illustrated in the accompanying drawings. It will also be apparent to those skilled in the art that various modifications and variations can be made in the present invention without departing from the spirit or scope of the invention.

FIG. 2 is a flowchart for explaining a control method of a mobile terminal according to the present invention.

Referring to FIG. 2, in a power-off state, the user input unit 123 senses a preset user input (S210).

In an embodiment, the mobile terminal 100 which is in an 'on' state may be converted into an 'off' state, in a no-power state or a low-power state where a preset amount of power remains. In this case, the no-power state or the low-power state may be defined as a state where the battery 191 of the mobile terminal 100 has a difficulty in driving an OS.

In another embodiment, the mobile terminal 100 which is in an 'on' state may be converted into an 'off' state by a press input applied to an on/off button, or by a touch input applied to an on/off icon.

In another embodiment, the mobile terminal 100 which is in an 'on' state may be converted into an 'off' state, if it is difficult to perform a normal touch interface because a panel is destroyed.

A user input which can be sensed in a power-off state may be set in various manners. In an embodiment, the user input may be set as a long touch input applied to a home key.

In order for the user input unit 123 to sense a preset user input, a predetermined power is required. Accordingly, in the following steps, a no-power state or another case in another embodiment will be explained.

Next, as user information inputted through the user input is authenticated, the mobile terminal enters an emergency settlement mode where only some functions are performed by using a remaining power (S220).

The user information means user's unique information inputted for authentication. In an embodiment, if a long touch input is applied to a home key where a fingerprint can be applied, a user's fingerprint may be input.

Once the inputted user information is authenticated, the mobile terminal enters an emergency settlement mode where only some functions are performed by using a remaining power. In the emergency settlement mode, a settlement may be executable by using a minimum power which remains in the mobile terminal 100. That is, the emergency settlement mode may be defined as a mode where the mobile terminal can enter when a user authentication is completed and settlement information is transmitted to an external terminal.

As a result, in the emergency settlement mode, a function for settlement may be preferentially executed. In an embodiment, communication with a POS device for settlement (external terminal) may be preferentially executed, and a function unrelated to a settlement such as a call, an audio, a camera and a sensor (except for an authentication sensor) may be performed or may not be performed according to a power state.

In another embodiment, if inputted user information is not authenticated, user information may be requested again.

For instance, when a fingerprint authentication fails, re-input of a fingerprint may be requested three times. Alternatively, another type of user information input such as a password or a pattern may be requested. In this case, a flickering LED, etc. may be output with consideration of power consumption.

Then, in the emergency settlement mode, a settlement request signal is received from an external terminal, and settlement information corresponding to the settlement request signal is transmitted to the external terminal (S230).

The external terminal may perform a settlement based on wireless communication, and the settlement information means information required for settlement.

In an embodiment, the external terminal may be a POS device which performs NFC communication with the mobile terminal 100. More specifically, if the mobile terminal 100 approaches a POS device to receive a settlement request signal, card data of a default card (a preset settlement means) may be transmitted to the POS device.

Hereinafter, detailed embodiments will be explained.

In an embodiment, S210 may include receiving a power from the external terminal such that the remaining power is more than a threshold value for entering the emergency settlement mode, based on a gesture approaching to the external terminal.

In another embodiment, each of the steps may include outputting light in a preset manner in correspondence to each event through the optical output module 154, if at least one of the events occurs in a case that the preset user input is sensed, a case that the inputted user information is authenticated, a case that the mobile terminal enters the emergency settlement mode, a case that a settlement request signal is received from the external terminal, a case that settlement information corresponding to the settlement request signal is transmitted to the external terminal, and a case that a power is received from the external terminal.

In another embodiment, S220 may include entering the emergency settlement mode if user fingerprint information inputted through a fingerprint input unit disposed on a front surface or a rear surface is authenticated in the power-off state.

In another embodiment, S230 may include additionally receiving preset user information if the mobile terminal is on a preset position before the settlement information corresponding to the settlement request signal is transmitted to the external terminal.

In another embodiment, S230 may include transmitting the settlement information to the external terminal if the additionally-input user information is authenticated.

In another embodiment, S230 may include calculating a communication network to which the settlement information is to be transmitted, based on a range of a settlement amount corresponding to the settlement request signal.

In another embodiment, S230 may include transmitting the settlement information corresponding to the settlement request signal to the external terminal, via the calculated communication network.

In another embodiment, S230 may include controlling the optical output module 154 such that light is outputted in a preset manner if an event which cannot be settled by a preset settlement means occurs, and changing the settlement means based on a preset user input.

In another embodiment, S230 may include outputting video information corresponding to the settlement information, to one region of the display unit 151 which is in an off state.

As aforementioned, the user input unit 123 may sense a preset user input in a power-off state.

The controller 180 may control the mobile terminal to enter an emergency settlement mode where only some functions are executed by using a remaining power, if user information inputted through the user input is authenticated.

In the emergency settlement mode, the wireless communication unit 110 may receive a settlement request signal from an external terminal, and may transmit settlement information corresponding to the settlement request signal to the external terminal.

In an embodiment, the controller 180 may receive a power from the external terminal such that the remaining power may be more than a threshold value for entering the emergency settlement mode, based on a gesture approaching to the external terminal.

The optical output module 154 may output light in a preset manner in correspondence to each event, if at least one of the events occurs in a case that the preset user input is sensed, a case that the inputted user information is authenticated, a case that the mobile terminal enters the emergency settlement mode, a case that a settlement request signal is received from the external terminal, a case that settlement information corresponding to the settlement request signal is transmitted to the external terminal, and a case that a power is received from the external terminal.

In another embodiment, the controller 180 may control the mobile terminal to enter the emergency settlement mode if user fingerprint information inputted through the fingerprint input unit disposed on the front surface or the rear surface is authenticated in the power-off state.

FIG. 3 is a flowchart showing an embodiment of an emergency settlement process.

Referring to FIG. 3, a long touch input 400 applied to a home key in a power-off state is sensed (S310).

Figure 4:
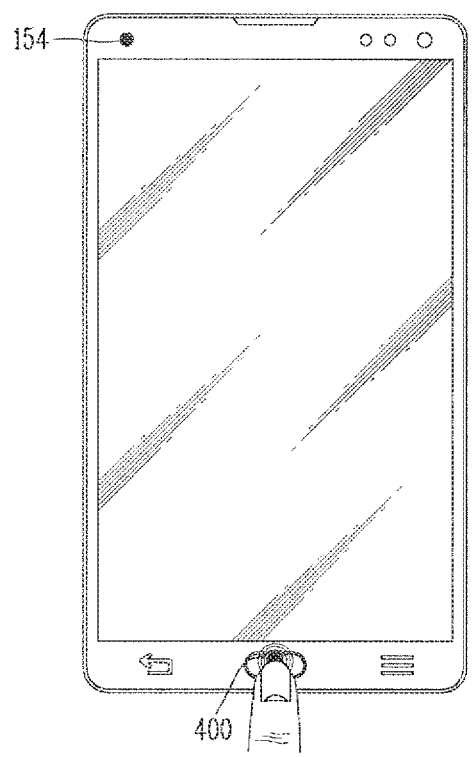
FIG. 4 is a conceptual view showing an embodiment to input a fingerprint in order to enter an emergency settlement mode.

With regards to this, FIG. 4 is a conceptual view showing an embodiment to input a fingerprint in order to enter an emergency settlement mode.

Referring to FIG. 4, if a user applies a long touch input 400 to a home key in a power-off state, a fingerprint of the user may be input.

The power-off state means a state for protection of the battery 191, but a predetermined amount of power remains for an emergency case. With such a minimum power, the long touch input 400 applied to the home key may be sensed.

The controller 180 may determine whether the inputted user fingerprint is authenticated or not (S320). More specifically, the controller 180 determines whether the inputted user fingerprint matches a fingerprint stored in the memory 170. If the inputted user fingerprint does not match the fingerprint, the step is terminated.

On the other hand, if the inputted user fingerprint is authenticated, a red LED indicator is turned on (S330). That is, the mobile terminal enters an emergency settlement mode.

Referring to FIG. 4, if the inputted user fingerprint is authenticated, red LED light is outputted from the optical output module 154, and the mobile terminal enters an emergency settlement mode.

Then, if the mobile terminal 100 approaches a POS device for settlement, a settlement request signal is received from the POS device via a short-distance communication network (S340).

An orange LED indicator flickers for several seconds in order to display the received state of the settlement request signal. And a green LED indicator flickers while a corresponding settlement is prepared (S350).

Figure 5:
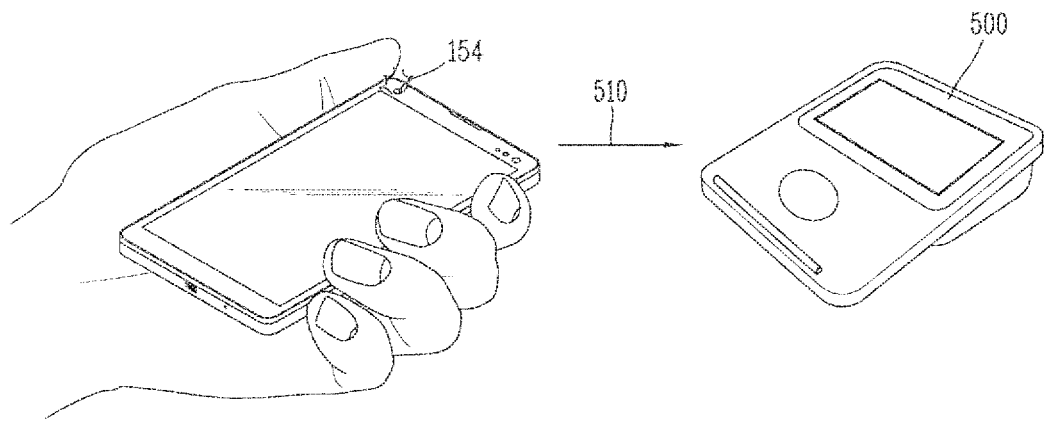
FIG. 5 is a conceptual view for explaining an embodiment where communication is performed as a mobile terminal approaches an NFC settlement terminal.

With regards to this, FIG. 5 is a conceptual view for explaining an embodiment where communication is performed as the mobile terminal approaches an NFC settlement terminal.

Referring to FIG. 5, if a gesture 510 to approach the mobile terminal 100 to an NFC settlement terminal 500 is applied, a settlement request signal is received from the NFC settlement terminal 500 through an NFC communication network.

In order to display the received state of the settlement request signal, orange LED light outputted from the optical output module 154 flickers for several seconds. Then, green LED light flickers while a settlement corresponding to the settlement request signal is being prepared.

As the settlement request signal is received, an NFC settlement signal (settlement information) corresponding to the settlement request signal is transmitted to a POS device. Then, the green LED indicator is turned on (S360).

Referring to FIG. 5, the settlement information corresponding to the settlement request signal received from the NFC settlement terminal 500 is transmitted to the NFC settlement terminal 500. In an embodiment, a data signal of a settlement card set as a default may be transmitted. More specifically, token data of a default card is stored by using a program memory region of an NFC IC, and then is used at the time of an emergency settlement.

In an embodiment shown in FIGS. 4 and 5, red, orange and green LED lights may flicker or may be outputted from the optical output module 154. More specifically, if the mobile terminal 100 is initialized or a user authentication is completed, red LED light is output for several seconds. If a POS device is recognized, orange LED light may flicker for several seconds. Alternatively, if a settlement is prepared or a settlement is completed, green LED light may flicker for several seconds.

In an embodiment, the number of times that LED light flickers or is outputted, etc., may be set to minimize power consumption.

As aforementioned, the controller 180 may receive a power from the external terminal such that the remaining power may be more than a threshold value for entering the emergency settlement mode, based on a gesture approaching to the external terminal.

In an embodiment, in a power-off state, the mobile terminal may enter the emergency settlement mode by using energy of an RF field of a POS device received from an NFC antenna.

Figure 6:
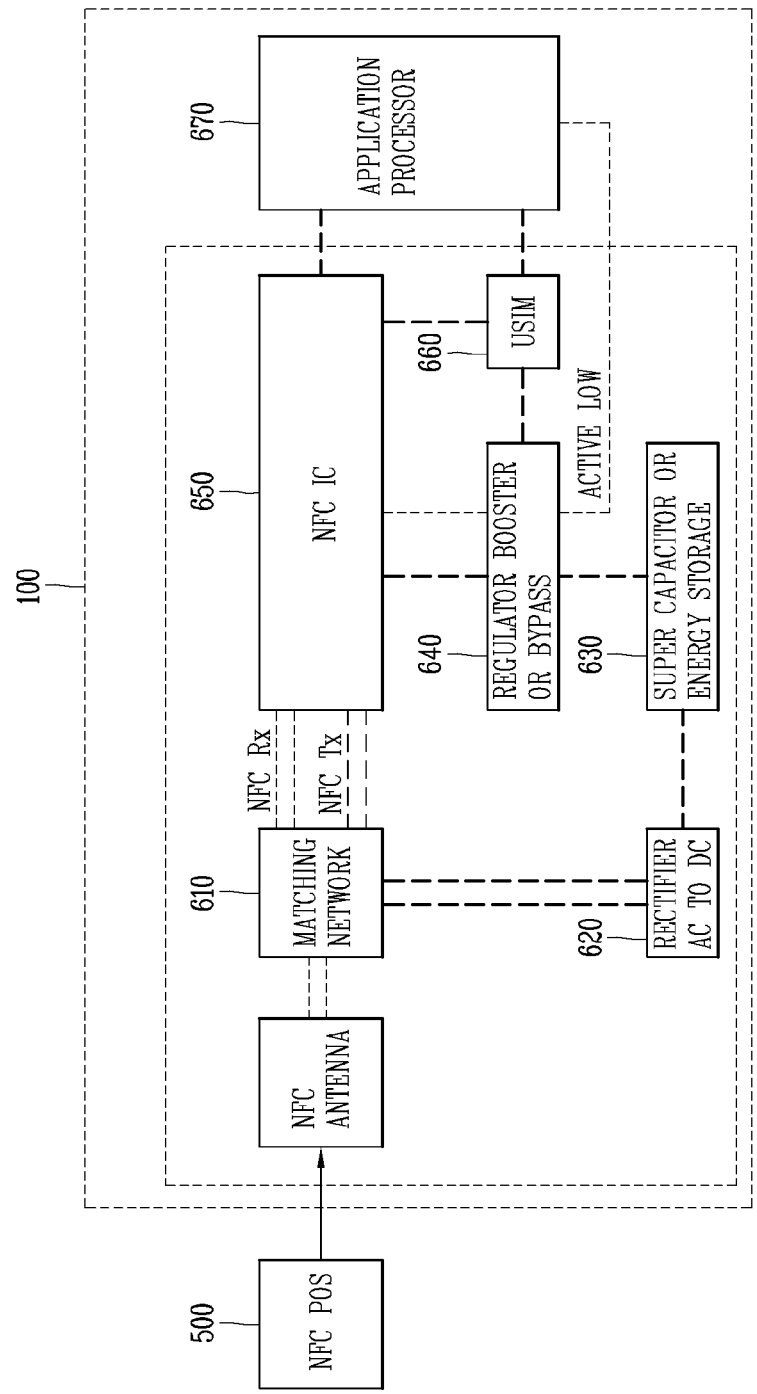
FIG. 6 is a block diagram for explaining an embodiment to be provided with charging energy from an external terminal.

FIG. 6 is a block diagram for explaining an embodiment to be provided with charging energy from an external terminal.

Referring to FIG. 6, a ping power (e.g., 13.56 MHz AC polling power) or a wireless power (e.g., 13.56 MHz AC power) of an NFC POS device 500 (transmitter) may be stored in a super capacitor or an energy storage 630 through a matching network 610 and a rectifier block 620.

Based on such a stored energy source, a regulator 640 may be enabled to supply a power to an NFC IC 650 and a USIM 660.

Then, if the NFC IC 650 recognizes an on-state of the power of the power supply source through the super capacitor 630, the current mode is automatically converted into an emergency settlement mode.

The NFC IC 650 records settlement information in a storage unit of the USIM 660 by being interworked with the USIM 660, and provides the settlement information of the USIM 660 to the NFC POS device 500 (transmitter) through an NFC protocol. As a result, a settlement is performed.

If the mobile terminal 100 is turned on, an application processor (AP) 670 reads the settlement information stored in the USIM 660, and then informs a user of a usage history by being interworked with a settlement application.

As the settlement information is transmitted, the NFC POS device 500 (transmitter) may deduct a settlement amount from a user's account, based on the settlement information of the USIM 660.

Figure 7:
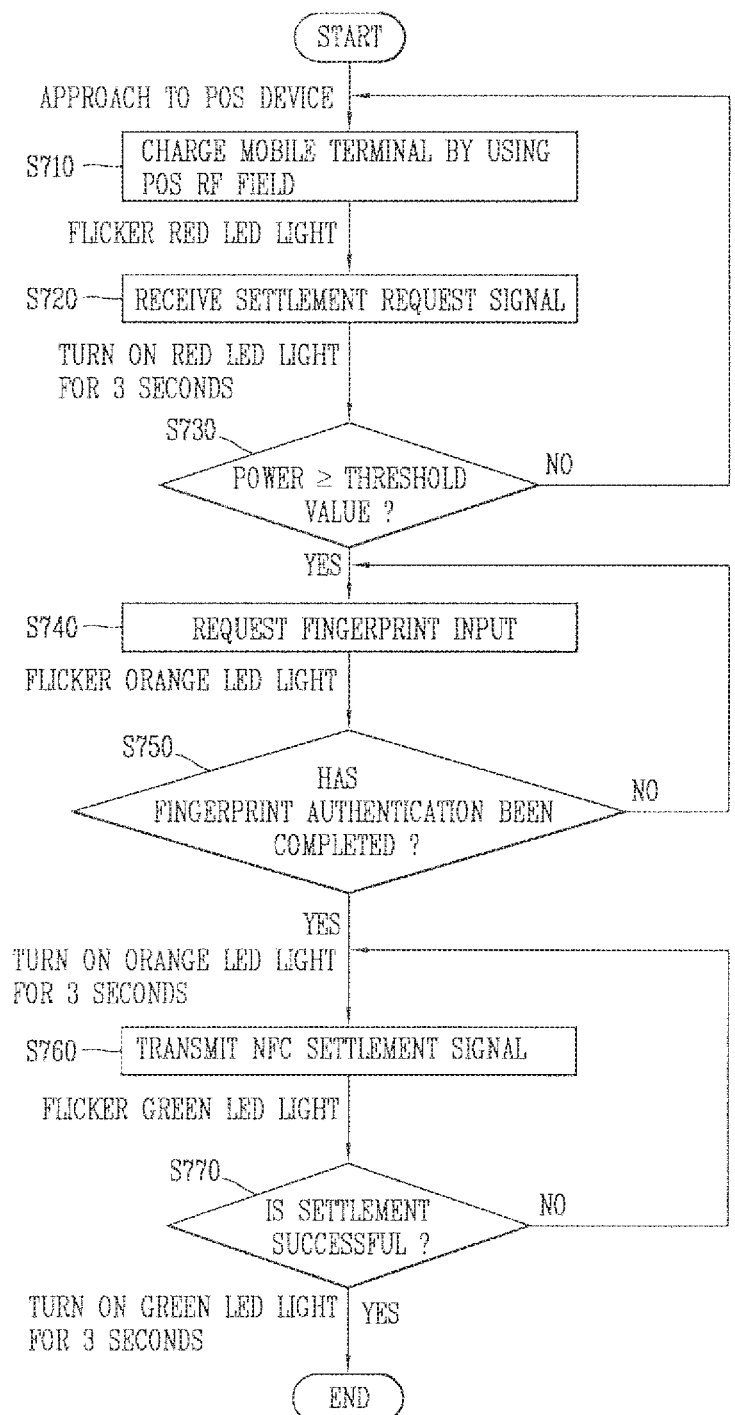
FIG. 7 is a flowchart for explaining an embodiment to be provided with charging energy from an external terminal and to perform an emergency settlement.

FIG. 7 is a flowchart for explaining an embodiment where charging energy is provided from an external terminal and an emergency settlement is performed.

Referring to FIG. 7, if the mobile terminal 100 approaches a POS device 500, the mobile terminal 100 is charged or harvested by using RF field energy of the POS device 500 (S710). An embodiment related to this has been aforementioned with reference to FIG. 6.

As the charging is performed, red LED light outputted from the optical output module 154 flickers. An embodiment related to this is similar to that aforementioned with reference to FIG. 5.

Then, a settlement request signal is received from the POS device 500 (S720). Once the settlement request signal is received, red LED light may be outputted from the optical output module 154 for 3 seconds.

Then, it is determined whether a power amount of the battery 191 is more than a threshold value (S730). If the power amount is less than the threshold value, the charging step (S710) is performed again.

On the other hand, if the power amount is more than the threshold value, a fingerprint input is requested (S740). When the fingerprint input is requested, orange LED light from the optical output module 154 may flicker.

Then, it is determined whether the inputted fingerprint is authenticated or not (S750). If the inputted fingerprint is not authenticated, the fingerprint input requesting step (S740) is performed again.

On the other hand, if the inputted fingerprint is authenticated, orange LED light may be outputted from the optical output module 154 for 3 seconds.

Figure 8:
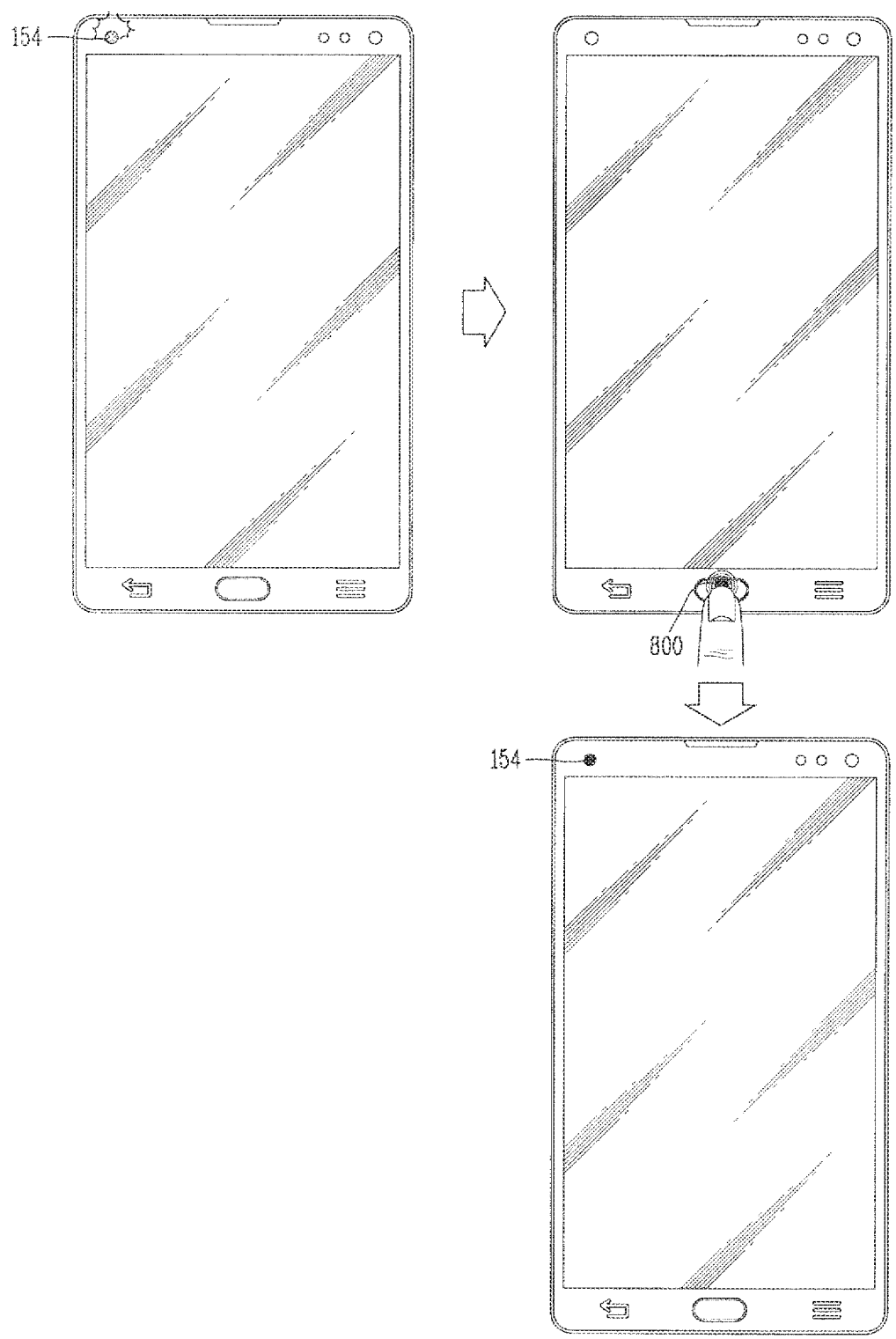
FIG. 8 is a conceptual view showing another embodiment to input a fingerprint in order to enter an emergency settlement mode.

With regards to S740 and S750, FIG. 8 is a conceptual view showing another embodiment to input a fingerprint in order to enter an emergency settlement mode.

Referring to FIG. 8, as orange LED light is outputted from the optical output module 154, a user may recognize the fingerprint input requesting step (S740).

Accordingly, the user may input a fingerprint by applying a long touch input 800 to a home key where a fingerprint can be input. If the inputted fingerprint is authenticated, orange LED light may be outputted from the optical output module 154 for 3 seconds.

Once the fingerprint authentication is completed, an NFC settlement signal is transmitted to the POS device 500 (S760). While a settlement is prepared, green LED light outputted from the optical output module 154 may flicker.

Then, it is determined whether the settlement is successful or not (S770). If the settlement is successful, green LED light may be outputted from the optical output module 154 for 3 seconds. On the other hand, if the settlement is not successful, S760 for transmitting the NFC settlement signal to the POS device 500 is performed again.

In an embodiment shown in FIGS. 7 and 8, a user may recognize each settlement step based on a color of LED light outputted from the optical output module 154, whether the light flickers or not, an output time, etc.

More specifically, flickering of LED light indicates a request reception or a preparation completion in each step, and a continuous output of the LED light indicates a completion of each step.

An emergency settlement mode may be a mode where the mobile terminal can enter when a user authentication is completed, and may be defined as a step of transmitting settlement information to an external terminal. In this case, functions unrelated to a settlement, such as a calling, an audio, a camera and a sensor (except for an authentication sensor) may be performed or may not be performed according to a power state.

In an embodiment, a step of checking a power of the battery 191 or receiving a settlement request signal from the POS device may be performed before or after the emergency settlement mode.

Before settlement information corresponding to the settlement request signal is transmitted to the external terminal, the user input unit 123 may additionally receive preset user information if the mobile terminal is on a preset position.

Accordingly, the wireless communication unit 110 may transmit the settlement information to the external terminal, if the additionally-input user information is authenticated.

The display unit 151 may output video information corresponding to the settlement information, to its one region which is in an off state.

As aforementioned, when the fingerprint authentication is completed, the mobile terminal may enter the emergency settlement mode, and may receive a settlement request signal from the POS device 500.

Figure 9:
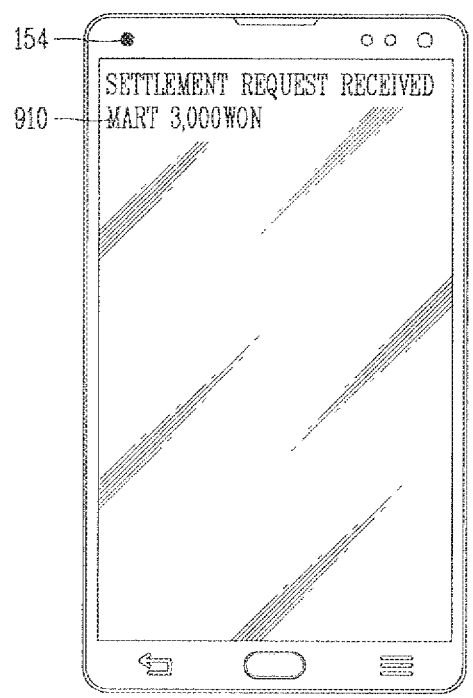
FIG. 9 is a conceptual view for explaining an embodiment of a user interface outputted when a settlement request signal is received.
Figure 10:
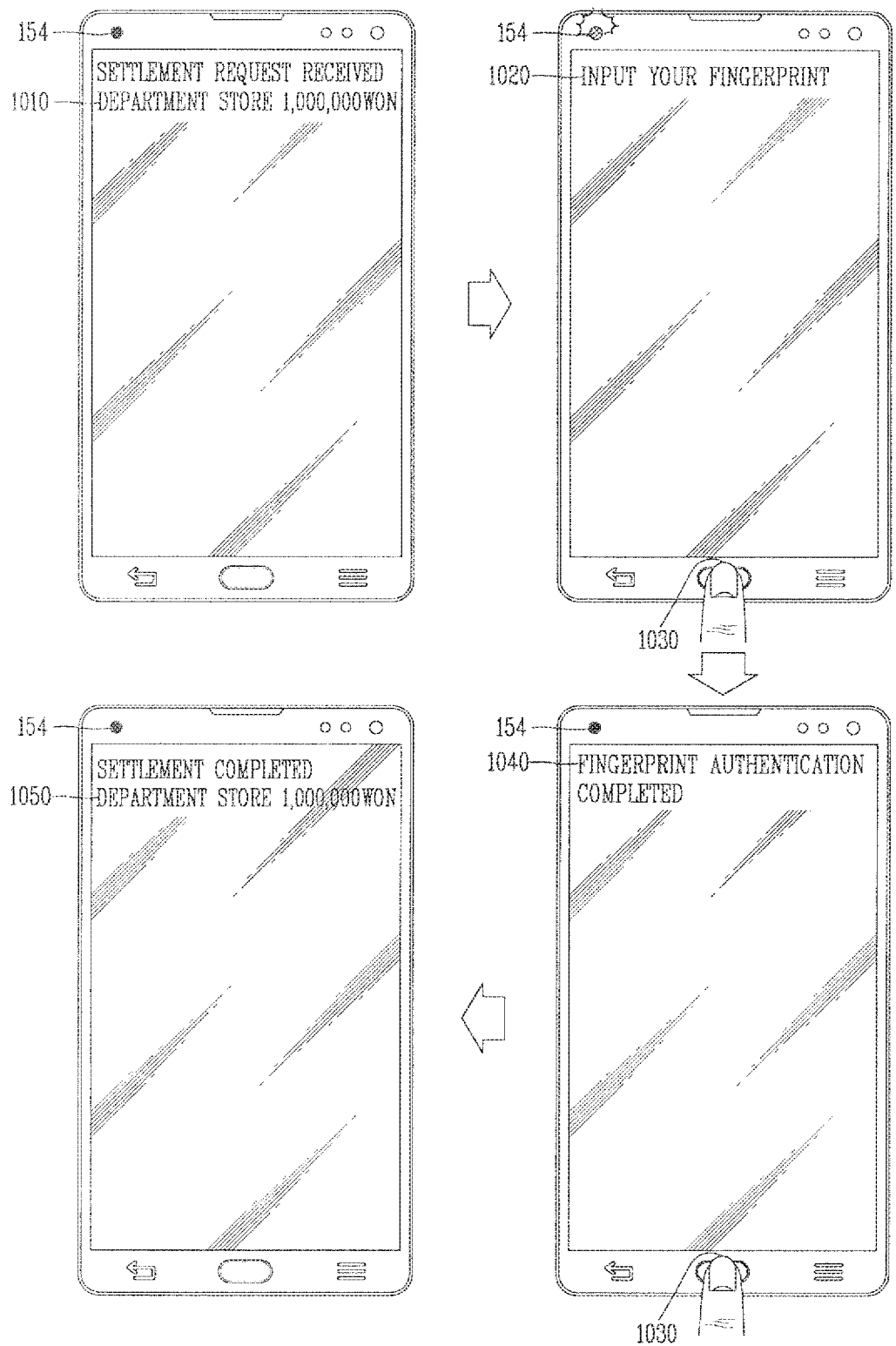
FIG. 10 is a conceptual view for explaining an embodiment to additionally request authentication information at the time of an emergency settlement, according to a position of a mobile terminal.

In an embodiment shown in FIGS. 9 and 10, it is assumed that a user authentication for entering the emergency settlement mode has been already completed.

FIG. 9 is a conceptual view for explaining an embodiment of a user interface outputted when a settlement request signal is received.

Referring to FIG. 9, if a settlement request signal is received from the POS device 500 inside a mart, red LED light may be outputted from the optical output module 154 for 3 seconds. And a requested settlement history 910 may be outputted to one region of the display unit 151 which is in an off state.

FIG. 10 is a conceptual view for explaining an embodiment to additionally request authentication information at the time of an emergency settlement, according to a position of the mobile terminal.

Referring to FIG. 10, if a user approaches the mobile terminal 100 to the POS device 500 inside a department store, a charging may be performed by using RF field energy of the POS device 500. In this case, red LED light which is flickering may be outputted from the optical light unit 154 (not shown).

Then, if a settlement request signal is received from the POS device 500 inside the department store, red LED light may be outputted from the optical output module 154 for 3 seconds. Further, a requested settlement content 1010 may be outputted to one region of the display unit 151 which is in an off state. The settlement content 1010 may include a settlement place, a settlement amount, etc.

If it is determined that the mobile terminal 100 is on a preset position, a user's information input may be requested again for authentication. In an embodiment, if it is determined that the mobile terminal 100 is positioned in the department store, a message 1020 to request a fingerprint input may be outputted to one region of the display unit 151 which is in an off state. Further, orange LED light which flickers may be outputted from the optical output module 154.

In an embodiment related to this, the position of the mobile terminal 100 may be calculated by the location information module 115 such as a GPS module, or may be calculated by the POS device 500 with which the mobile terminal communicates. That is, if it is sensed that the POS device 500 with which the mobile terminal communicates is positioned in the department store, through a wireless communication network, unique information, etc., it may be calculated that the mobile terminal 100 is positioned in the department store.

If a fingerprint input is performed through a long touch input 1030 applied to a home key where a fingerprint can be input, according to a request of a fingerprint input, a message indicating that the fingerprint is being authenticated may be outputted to one region of the display unit 151 which is in an off state. In another embodiment, a fingerprint input may be performed through a pressing input applied to the home key where a fingerprint can be input.

If the fingerprint is authenticated, orange LED light may be outputted from the optical output module 154 for 3 seconds. Further, a message 1040 indicating that the fingerprint authentication is completed may be outputted to one region of the display unit 151 which is in an off state.

As the fingerprint authentication is completed, settlement information corresponding to the settlement request signal may be transmitted to the POS device 500 for settlement. While a settlement preparation such as transmission of settlement information is being performed, or after the settlement preparation is completed, green LED light which flickers may be outputted from the optical output module 154 (not shown).

Then, if the settlement is completed, green LED light may be outputted from the optical output module 154 for 3 seconds. Further, a message 1050 indicating the settlement completion may be outputted to one region of the display unit 151 which is in an off state. The message 1050 indicating the settlement completion may include a settlement place, a settlement amount, a settlement means, etc.

In another embodiment, if a settlement request signal is received and a pressing input is continuously applied to the home key for a fingerprint input, an emergency settlement may be performed. That is, if a user continuously presses the home key, the emergency settlement is completed.

In the aforementioned embodiments, the emergency settlement mode may be a mode where the mobile terminal can enter when a first user authentication is completed, and may be defined as a step of transmitting settlement information to an external terminal. In this case, functions unrelated to a settlement, such as a calling, an audio, a camera and a sensor (except for an authentication sensor) may be performed or may not be performed according to a power state.

In an embodiment, a step of checking a power of the battery 191 or receiving a settlement request signal from the POS device may be performed before or after the emergency settlement mode.

After checking the power of the battery 191, the settlement request signal may be received from the POS device. Alternatively, after receiving the settlement request signal from the POS device, the power of the battery 191 may be checked.

In another embodiment, as shown in FIG. 10, if the mobile terminal 100 is on a preset position, a second user authentication may be additionally requested before an emergency settlement.

In another embodiment, if a settlement amount is more than a preset amount, a second user authentication may be additionally requested before an emergency settlement.

The controller 180 may calculate a communication network to which the settlement information is to be transmitted, based on a range of a settlement amount corresponding to the settlement request signal.

Accordingly, the wireless communication unit 110 may transmit the settlement information corresponding to the settlement request signal to the external terminal, via the calculated communication network.

Figure 11A:
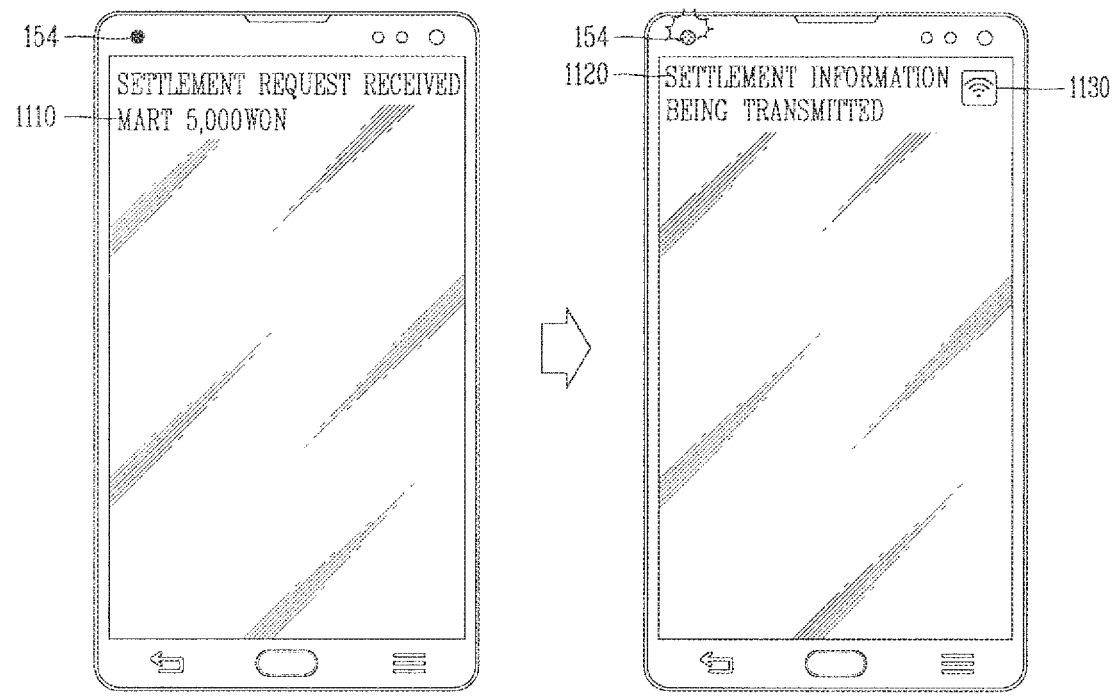
FIGS. 11A and 11B are conceptual views for explaining an embodiment to use a different communication network at the time of an emergency settlement, according to a settlement amount.
Figure 11B:
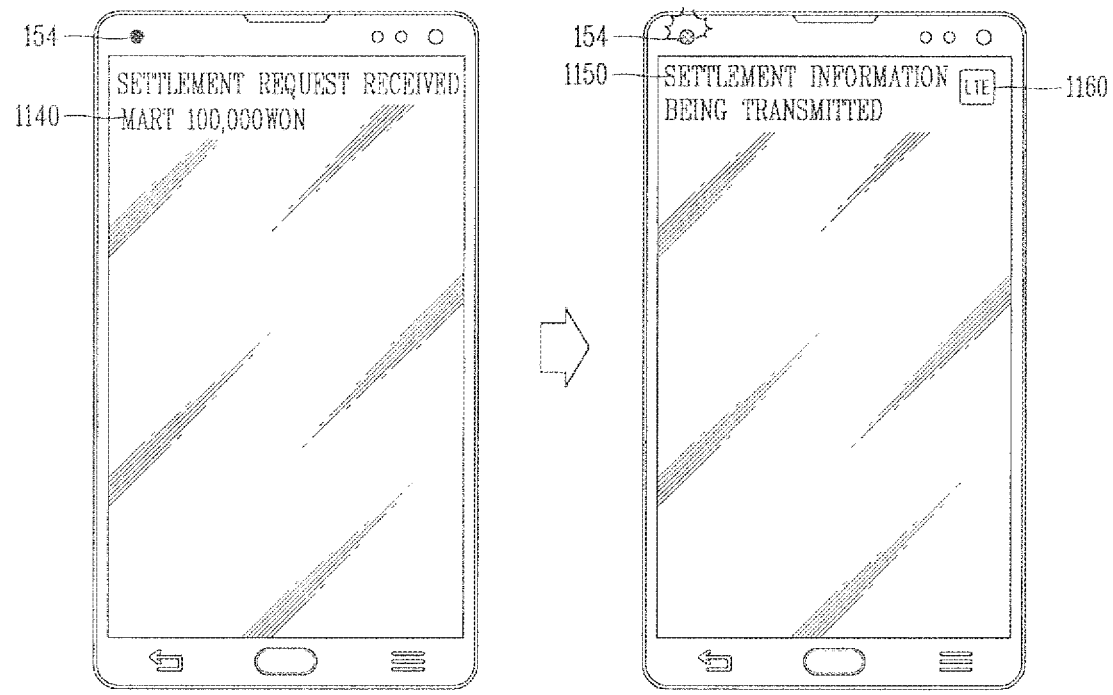

FIGS. 11A and 11B are conceptual views for explaining an embodiment to use a different communication network at the time of an emergency settlement, according to a settlement amount.

Referring to FIG. 11A, if a settlement request signal is received from the POS device 500 inside a mart, red LED light may be outputted from the optical output module 154 for 3 seconds. And a requested settlement history 1110 may be outputted to one region of the display unit 151 which is in an off state.

Then, a communication network to which settlement information is to be transmitted may be calculated based on a settlement amount according to the settlement request signal. If the settlement amount is less than a preset amount, a power amount may be preferentially considered such that a first network having a security state of a middle level may be selected.

That is, the settlement information is transmitted to the POS device 500 inside the mart through the first network. In this case, a message 1120 indicating that the settlement information is being transmitted, and an icon 1130 corresponding to the first network may be outputted to one region of the display unit 151 which is in an off state. Further, green LED light which flickers may be outputted from the optical output module 154.

Referring to FIG. 11B, if a settlement request signal is received from the POS device 500 inside the mart, red LED light may be outputted from the optical output module 154 for 3 seconds. And a requested settlement history 1140 may be outputted to one region of the display unit 151 which is in an off state.

Likewise, a communication network to which settlement information is to be transmitted may be calculated based on a settlement amount according to the settlement request signal. If the settlement amount is more than a preset amount, a second network having a highest security may be selected.

That is, the settlement information is transmitted to the POS device 500 inside the mart through the second network. In this case, a message 1150 indicating that the settlement information is being transmitted, and an icon 1160 corresponding to the second network may be outputted to one region of the display unit 151 which is in an off state. Further, green LED light which flickers may be outputted from the optical output module 154.

Hereinafter, will be further explained an embodiment to preset an environment setting value related to an emergency settlement, an embodiment related to an emergency settlement process, and an embodiment to check a usage history after an emergency settlement.

Figure 12:
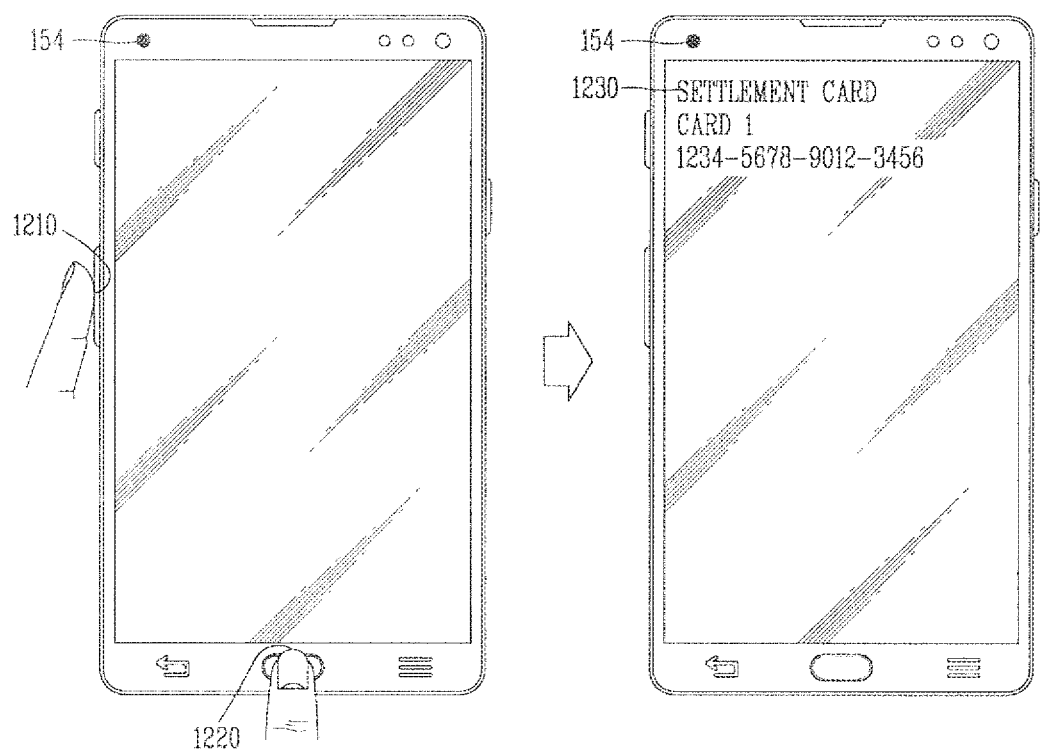
FIG. 12 is a conceptual view for explaining an embodiment of a user input for entering an emergency settlement mode.

FIG. 12 is a conceptual view for explaining an embodiment of a user input for entering an emergency settlement mode.

Referring to FIG. 12, if a volume up button 1210 and a home button 1220 are simultaneously pressed in a power-off state, the mobile terminal may enter an emergency settlement mode.

Here, information 1230 on a preset settlement means may be outputted to one region of the display unit 151 which is in an off state. For instance, settlement card information 1230 set as a default may be output.

The controller 180 may control the optical output module such that light may be outputted in a preset manner if an event which cannot be settled by a preset settlement means occurs, and may change the settlement means based on a preset user input.

Figure 13:
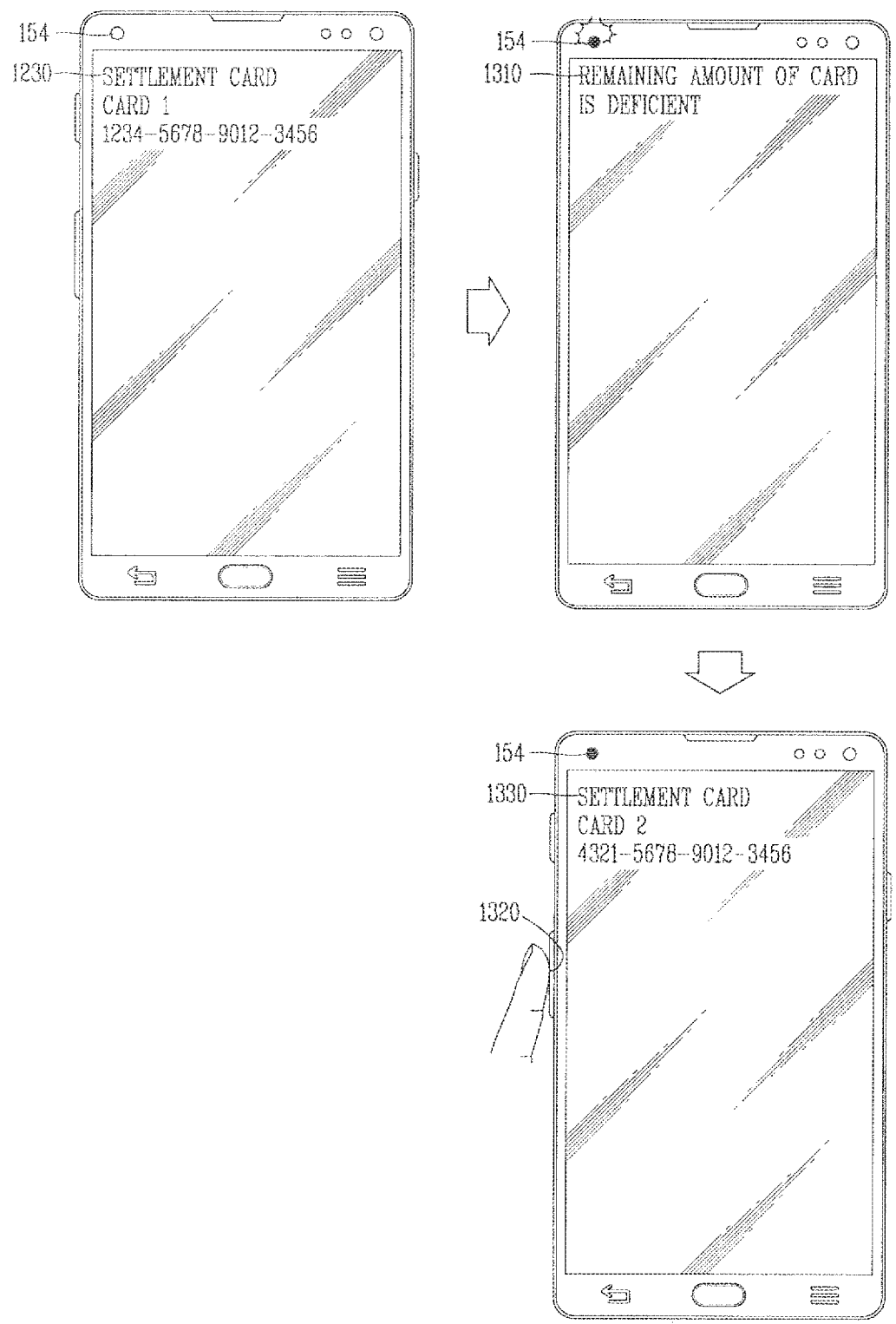
FIG. 13 is a conceptual view for explaining an embodiment to change a settlement means at the time of an emergency settlement.

FIG. 13 is a conceptual view for explaining an embodiment to change a settlement means at the time of an emergency settlement.

Referring to FIG. 13, if a remaining amount of a first card is deficient at the time of a settlement after first card information 1230 is output, a message 1310 indicating the state may be outputted to one region of the display unit 151 which is in an off state. Further, red LED light which flickers may be outputted from the optical output module 154.

Accordingly, a user may select a card which will be used to perform a settlement, from a plurality of cards, by pressing a volume control button. In an embodiment, if a volume down button 1320 is pressed once, a second card may be selected as a settlement card, and card information 1330 of the second card may be outputted to one region of the display unit 151 which is in an off state.

Figure 14:
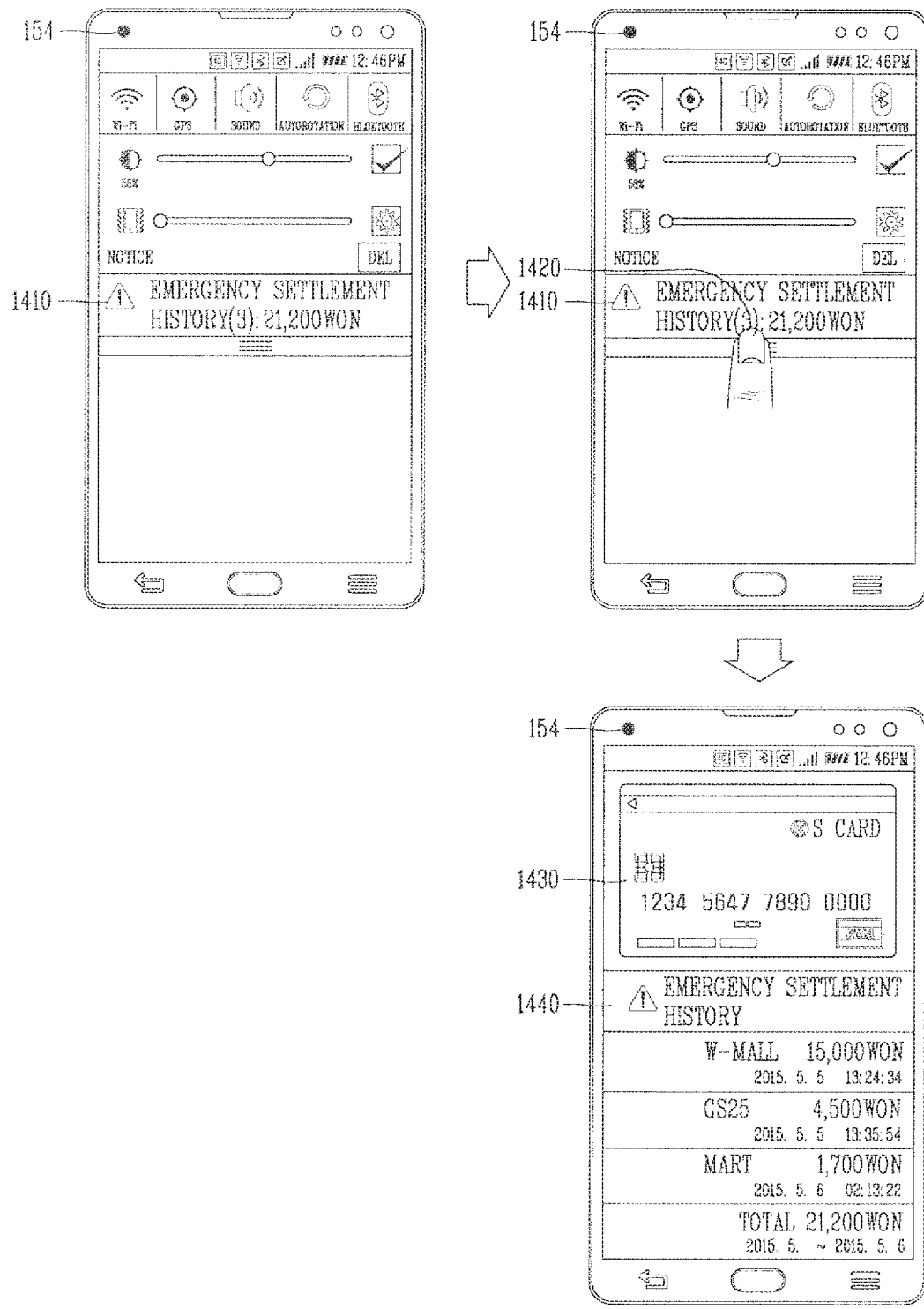

FIG. 14 is a conceptual view for explaining an embodiment to check an emergency settlement history when a power is turned on.

Referring to FIG. 14, if the power is turned on, an emergency settlement history 1410 which was being written in an off state may be outputted to a notification window. The emergency settlement history 1410 may include the number of settlements, a settlement amount, etc.

Then, if a touch input 1420 is applied to the emergency settlement history 1410, detailed contents 1430, 1440 of an emergency settlement may be outputted.

In an embodiment, information 1430 on a settlement card which was used for an emergency settlement may be outputted. Further, settlement information 1440 such as a settlement place, an amount, a date, a time and a total settlement amount may be outputted.

Figure 15:
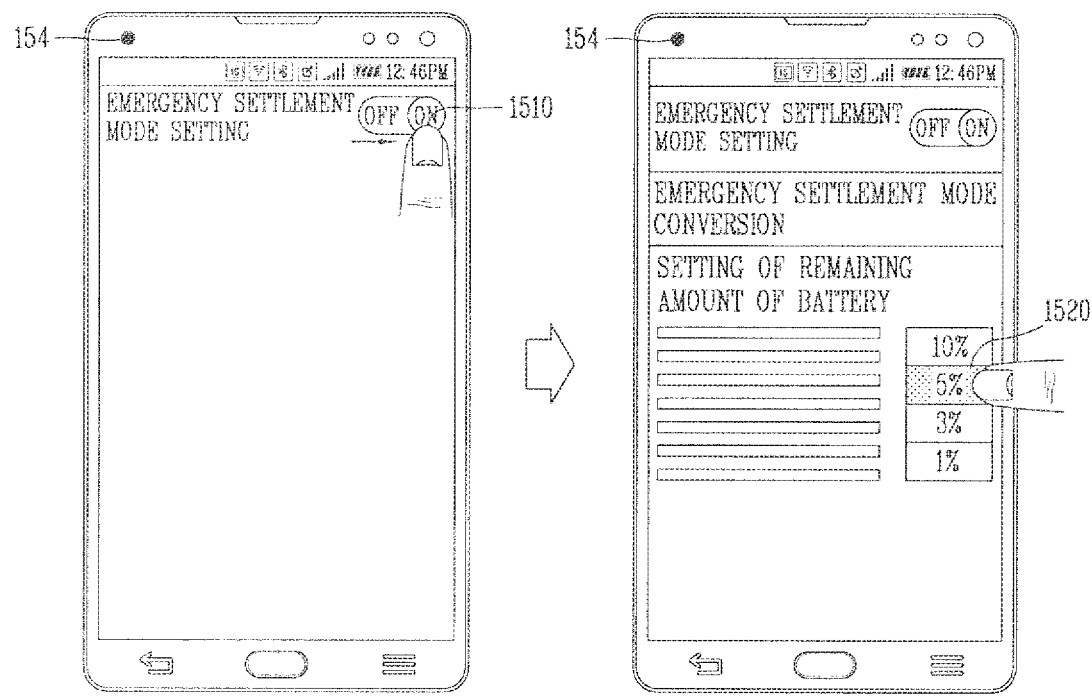
FIG. 15 is a conceptual view for explaining an embodiment to set an environment setting value related to an emergency settlement mode.

FIG. 15 is a conceptual view for explaining an embodiment to set an environment setting value related to an emergency settlement mode.

Referring to FIG. 15, an emergency settlement mode may be turned on by applying a drag input to an icon 1510 which sets an emergency settlement mode on an emergency settlement mode setting screen.

Accordingly, may be outputted a screen which explains the emergency settlement mode and which sets a threshold value of the battery 191 in the emergency settlement mode. In an embodiment, a capacity of the battery 191 which can enter the emergency settlement mode may be set as 5%, by applying a touch input to an icon 1520 which corresponds to a threshold value of 5%.

Figure 16:
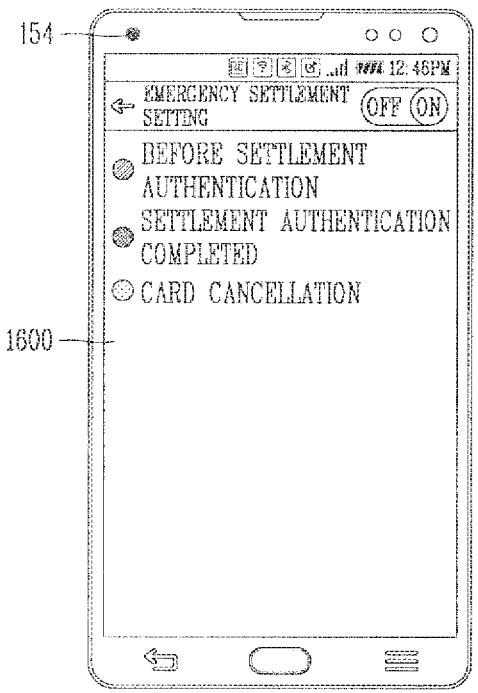
FIG. 16 is a conceptual view for explaining an embodiment to set a state of light outputted from an LED in an emergency settlement process.

FIG. 16 is a conceptual view for explaining an embodiment to set a state of light outputted from an LED in an emergency settlement process.

Referring to FIG. 16, in each emergency settlement step which is in a power-off state, may be outputted a screen 1600 for setting a color of LED light outputted from the optical output module 154, whether the light flickers or not, an output time, etc.

In an embodiment, it may be set that yellow, green, and red LED lights may be outputted from the optical output module 154 before a settlement authentication, after a settlement authentication, and at the time of a card cancellation, respectively.

Figure 17:
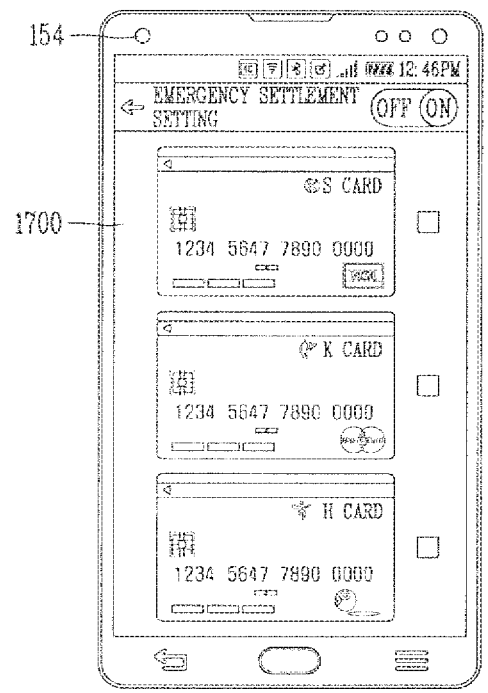
FIG. 17 is a conceptual view for explaining an embodiment to select a settlement means to be used at the time of an emergency settlement.

FIG. 17 is a conceptual view for explaining an embodiment to select a settlement means to be used at the time of an emergency settlement.

Referring to FIG. 17, a screen 1700 for selecting a settlement card to be used as a settlement means in an emergency settlement step may be outputted. In an embodiment, a user may set a credit card to be settled as a default value when the mobile terminal enters an emergency settlement mode, among a plurality of cards.

The mobile terminal and the control method thereof according to the present invention may have the following effects.

In at least one of preferred embodiments of the present invention, an emergency settlement may be performed even in a power-off state.

Further, in at least one of preferred embodiments of the present invention, a color of LED light outputted at the time of an emergency settlement, a flickering pattern, an output time, etc. may be directly set.

As a result, user convenience may be enhanced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal, comprising:
a touch screen configured to sense a preset user input in a power-off state;
a Near Field Communication (NFC) antenna configured to receive a settlement request signal from an external terminal in the power-off state;

a Near Field Communication integrated circuit (NFC IC);
an energy storage configured to store energy; and
a controller operably coupled to the touch screen and the NFC antenna, and configured to:
  cause the NFC IC to store token data of a default card associated with settlement information in a program memory region of the NFC IC;
  cause the NFC antenna to receive a radio frequency (RF) field energy from the external terminal in the power-off state;
  cause the energy storage to store the received RF field energy in the power-off state;
  determine whether a power amount of the stored RF field energy is more than a threshold value for entering an emergency settlement mode;
  cause the mobile terminal to enter the emergency settlement mode by using the stored RF field energy when a value of the power amount corresponding to the stored RF field energy is more than the threshold value in response to authentication of user information received via the touch screen in the power-off state, wherein only some functions among all functions available for the mobile terminal are performable by using power acquired from the stored RF field energy in the emergency settlement mode;
  cause the NFC antenna to transmit the settlement information corresponding to the settlement request signal to the external terminal while no settlement application program is activated in the emergency settlement mode,
  wherein the token data stored in the program memory region of the NFC IC is used at a time of an emergency settlement in the emergency settlement mode;
  access the settlement information stored in a universal subscriber identity module (USIM) when the mobile terminal is turned on in the emergency settlement mode; and
  cause the touch screen to display usage history associated with the settlement information by executing a settlement application program when the mobile terminal is turned on in the emergency settlement mode,
wherein the controller is further configured to supply the power to the NFC IC and the USIM based on the received RF field energy stored in the energy storage.

2. The mobile terminal of claim 1, wherein the controller is further configured to:
  receive the RF field energy from the external terminal until the value of the power amount of the stored RF field energy is more than the threshold value in response to the mobile terminal approaching the external terminal such that a distance between the mobile terminal and the external terminal is within a threshold range; and
  cause the power amount to increase to a value that is greater than the threshold value for entering the emergency settlement mode.

3. The mobile terminal of claim 2, further comprising an optical output module for outputting light in a preset manner according to a corresponding event such that the light is output in a different manner based on one of:
  a case that the preset user input is sensed;
  a case that the received user information is authenticated;
  a case that the mobile terminal enters the emergency settlement mode;
  a case that the settlement request signal is received from the external terminal;
  a case that settlement information corresponding to the settlement request signal is transmitted to the external terminal; or
  a case that the power is received from the external terminal.

4. The mobile terminal of claim 1, wherein the controller is further configured to control the mobile terminal to enter the emergency settlement mode in response to authentication of user fingerprint information received in the power-off state via a fingerprint input unit disposed on a front or rear surface of the mobile terminal.

5. The mobile terminal of claim 1, wherein the controller is further configured to additionally receive preset user information via the touch screen while the mobile terminal is located at a preset position prior to causing the NFC antenna to transmit the settlement information corresponding to the settlement request signal to the external terminal.

6. The mobile terminal of claim 5, wherein the controller is further configured to cause the NFC antenna to transmit the settlement information to the external terminal in the emergency settlement mode in response to authentication of the additionally received preset user information.

7. The mobile terminal of claim 1, wherein the controller is further configured to calculate a communication network to which the settlement information is to be transmitted based on a range of a settlement amount corresponding to the settlement request signal.

8. The mobile terminal of claim 7, wherein the controller is further configured to cause the NFC antenna to transmit the settlement information corresponding to the settlement request signal to the external terminal through the calculated communication network.

9. The mobile terminal of claim 3, wherein the controller is further configured to:
  control the optical output module to output light in a second preset manner corresponding to an event of which settlement cannot be completed by a first preset settlement means in response to the settlement request signal; and
  change settlement means to a second settlement means based on a preset user input received in response to the light output in the second preset manner.

10. The mobile terminal of claim 1, further comprising a display for outputting video information corresponding to the settlement information at one region of the display, the one region being in an off state.

11. A method for controlling a mobile terminal, the method comprising:
  sensing a preset user input received via a touch screen in a power-off state;
  storing token data of a default card associated with settlement information in a program memory region of a Near Field Communication integrated circuit (NFC IC);
  receiving a radio frequency (RF) field energy via an NFC antenna from an external terminal in the power-off state;
  storing the received RF field energy in an energy storage in the power-off state;
  determining whether a power amount of the stored RF field energy is more than a threshold value for entering an emergency settlement mode;
  entering the emergency settlement mode by using the stored RF field energy when a value of the power amount corresponding to the stored RF field energy is more than the threshold value in response to authentication of user information received via the touch screen in the power-off state, wherein only some functions among all functions available for the mobile terminal are performable by using power acquired from the stored RF field energy in the emergency settlement mode;

receiving a settlement request signal from the external terminal via the NFC antenna;

transmitting the settlement information corresponding to the settlement request signal to the external terminal via the NFC antenna while no settlement application program is activated in the emergency settlement mode, wherein the token data is used at a time of an emergency settlement in the emergency settlement mode;

accessing the settlement information stored in a universal subscriber identity module (USIM) when the mobile terminal is turned on in the emergency settlement mode; and displaying usage history associated with the settlement information on the touch screen by executing a settlement application program when the mobile terminal is turned on in the emergency settlement mode, wherein the power is supplied to the NFC IC and the USIM based on the received RF field energy stored in the energy storage.

12. The method of claim 11, further comprising:

receiving the RF field energy from the external terminal until the value of the power amount of the stored RF field energy is more than the threshold value in response to the mobile terminal approaching the external terminal such that a distance between the mobile terminal and the external terminal is within the threshold range; and causing the power amount to increase to a value that is greater than the threshold value for entering the emergency settlement mode.

13. The method of claim 12, wherein the mobile terminal further comprises an optical output module, the method further comprising outputting, by the optical output module, light in a preset manner according to a corresponding event such that the light is output in a different manner based on one of:

a case that the preset user input is sensed;
a case that the received user information is authenticated;
a case that the mobile terminal enters the emergency settlement mode;
a case that the settlement request signal is received from the external terminal;
a case that the settlement information corresponding to the settlement request signal is transmitted to the external terminal; or
a case that the power is received from the external terminal.

14. The method of claim 11, further comprising authenticating user fingerprint information received in the power-off state via a fingerprint input unit disposed on a front or rear surface of the mobile terminal prior to entering the emergency settlement mode.

15. The method of claim 11, further comprising additionally receiving preset user information while the mobile terminal is located at a preset position prior to transmitting the settlement information corresponding to the settlement request signal to the external terminal.

16. The method of claim 15, further comprising authenticating the additionally received preset user information prior to transmitting the settlement information to the external terminal.

17. The method of claim 11, further comprising calculating a communication network to which the settlement information is to be transmitted based on a range of a settlement amount corresponding to the settlement request signal.

18. The method of claim 17, wherein the settlement information corresponding to the settlement request signal is transmitted to the external terminal through the calculated communication network.

19. The method of claim 13, further comprising:

controlling the optical output module to output light in a second preset manner corresponding to an event of which settlement cannot be completed by a first preset settlement means in response to the settlement request signal; and changing settlement means to a second settlement means based on a preset user input received in response to the light output in the second preset manner.

20. The method of claim 11, further comprising outputting video information corresponding to the settlement information at one region of a display, the one region being in an off state.

* * * * *